(12) United States Patent
Yang et al.

(10) Patent No.: US 12,527,596 B2
(45) Date of Patent: Jan. 20, 2026

(54) ULTRASONIC SURGICAL INSTRUMENT

(71) Applicant: REACH SURGICAL, INC., Tianjin (CN)

(72) Inventors: Qiang Yang, Tianjin (CN); Fengxian Zheng, Tianjin (CN); Yanyang Lei, Tianjin (CN); Xiaoyun Fan, Tianjin (CN); Sandong Li, Tianjin (CN)

(73) Assignee: REACH SURGICAL, INC., Tianjin (CN)

( * ) Notice: Subject to any disclaimer, the term of this patent is extended or adjusted under 35 U.S.C. 154(b) by 138 days.

(21) Appl. No.: 18/634,953

(22) Filed: Apr. 14, 2024

(65) Prior Publication Data

US 2024/0285301 A1 Aug. 29, 2024

Related U.S. Application Data

(63) Continuation of application No. PCT/CN2021/124742, filed on Oct. 19, 2021.

(51) Int. Cl.
*A61B 17/32* (2006.01)
(52) U.S. Cl.
CPC .............. *A61B 17/320068* (2013.01); *A61B 2017/320089* (2017.08); *A61B 2017/320094* (2017.08)

(58) Field of Classification Search
CPC .......... A61B 17/320092; A61B 2017/320094; A61B 17/28; A61B 17/2804; A61B 17/29; A61B 2017/2901
See application file for complete search history.

(56) References Cited

U.S. PATENT DOCUMENTS

| | | | |
|---|---|---|---|
| 2004/0147945 A1 | 7/2004 | Fritzsch | |
| 2023/0051981 A1* | 2/2023 | Asahina | A61B 17/320092 |

* cited by examiner

*Primary Examiner* — Ashley L Fishback
(74) *Attorney, Agent, or Firm* — Foley & Lardner LLP

(57) ABSTRACT

An ultrasonic surgical instrument includes a waveguide for transmitting ultrasonic energy, the distal end of the waveguide connected to a blade; a jaw member pivotable with respect to the blade; an inner tube sleeved on the waveguide; and an outer tube sleeved on the inner tube. The jaw member is pivotally connected to the distal end of the outer tube, the distal end of the inner tube acting on the jaw member, and the inner tube sliding with respect to the outer tube and driving the jaw member to pivot with respect to the blade. A first abutting portion provided on the distal ends of the inner tube and the outer tube forms a support between the inner and outer tube, so as to avoid a radial clearance change between the inner tube and the outer tubes without affecting the relative sliding movement of the inner and outer tubes.

20 Claims, 13 Drawing Sheets

US 12,527,596 B2

ULTRASONIC SURGICAL INSTRUMENT

CROSS-REFERENCE TO RELATED PATENT APPLICATIONS

This application is a continuation application of International Application PCT/CN2021/124742, filed on Oct. 19, 2021, which is hereby incorporated by reference in its entirety.

TECHNICAL FIELD

The present application relates to the field of surgical instrument, and specifically to an ultrasonic surgical instrument.

BACKGROUND

An ultrasonic surgical instrument, also referred to as ultrasonic soft tissue cutting/hemostasis system, is configured to achieve tissue cutting and coagulation during surgical procedures. By setting different output power levels, a high-power level can be used for cutting tissue more rapidly, and a low-power level can be used for better coagulating tissue, thereby minimizing damage to the patient. It is mostly used in open surgery, laparoscopic or endoscopic surgery, and robot-assisted surgery.

The cutting action of an ultrasonic surgical instrument is usually achieved by an end effector assembly located at the distal end of the instrument. An ultrasonic surgical instrument comprises a handle, a jaw member, an inner tube, an outer tube, and a waveguide that transmits ultrasonic energy, wherein the distal end of the waveguide is a blade. The surgeon actuates the jaw member by pressing the handle so that the jaw member presses against the blade. The blade transmits ultrasonic energy to the patient's tissue, the heat generated by friction causes water contained in tissue cells which are in contact with the blade to vaporize, protein hydrogen bonds break, cells disintegrate and re-fuse, and the tissue is cut after it is coagulated. When cutting blood vessels, the blade is in contact with tissue proteins, and heat is generated through mechanical vibration, which destroys the collagen structure in the tissue and causes protein coagulation, thereby sealing the blood vessels and achieving hemostasis purpose.

SUMMARY

It is provided in the present disclosure an ultrasonic surgical instrument, comprising: a waveguide for transmitting ultrasonic energy, wherein a blade is arranged on the distal end thereof; a jaw member pivotable arranged with respect to the blade, wherein the jaw member has an open position and a closed position, wherein in the open position, the jaw member is spaced from the blade to receiving a tissue; and in the closed position, the jaw member is adjacent to the blade so as to cut the tissue located therebetween; an inner tube and an outer tube, wherein the inner tube is sleeved on the waveguide, and the outer tube is sleeved on the inner tube, wherein the jaw member is pivotally engaged with a distal end of the outer tube, and a distal end of the inner tube is engaged with the jaw member so that slide of the inner tube with respect to the outer tube actuates the jaw member to pivot with respect to the blade; wherein the ultrasonic surgical instrument further comprises a first abutting portion provided between the distal portions of the inner tube and the outer tube, configured to provide a support and maintain a radial clearance therebetween without affecting relative sliding movement of the inner tube and the outer tubes.

In some embodiments of the present disclosure, an inner side of the first abutting portion abuts or is formed integrally with an outer wall of the inner tube, and an outer side of the first abutting portion abuts or is formed integrally with an inner wall of the outer tube.

In some embodiments of the present disclosure, the first abutting portion is at least one sheet provided between the inner tube and the outer tube.

In some embodiments of the present disclosure, an outer wall of the inner tube and/or an inner wall of the outer tube is provided with a recess, and the sheet is located within the recess.

In some embodiments of the present disclosure, the sheet is a long strip shape and extends along an axial direction of the inner tube and the outer tube.

In some embodiments of the present disclosure, the sheet is annular shape and surrounds an annular gap between the inner tube and the outer tube.

In some embodiments of the present disclosure, the first abutting portion is at least one first projection formed which is integrally with a wall of the inner tube and protruded outwardly.

In some embodiments of the present disclosure, the first projection is formed as a long strip extending in an axial direction of the inner tube.

In some embodiments of the present disclosure, the first projections are evenly arranged along a circumference direction of the inner tube.

In some embodiments of the present disclosure, the first projection is formed as an annular shape, spiral ring shape or arc shape provided along a circumference direction of the inner tube.

In some embodiments of the present disclosure, the first projections are formed as arc-shaped protruding points distributed in a matrix along the axial direction and the circumferential direction of the inner tube.

In some embodiments of the present disclosure, the first abutting portion is at least one second projection which is formed integrally with a wall of the outer tube and protruded inwardly.

In some embodiments of the present disclosure, the second projection is formed as a long strip extending in an axial direction of the outer tube.

In some embodiments of the present disclosure, the second projections are evenly arranged along a circumference direction of the outer tube.

In some embodiments of the present disclosure, the second projection is formed as an annular shape, spiral ring shape or arc shape surrounding an inner wall of the outer tube.

In some embodiments of the present disclosure, the second projections are formed an arc-shaped protruding points distributed in a matrix along the axial direction and the circumferential direction of the inner tube.

In some embodiments of the present disclosure, at least one sealing support is provided between the inner tube and the waveguide, and the sealing support is located at a node of the waveguide.

In some embodiments of the present disclosure, the first abutting portion is located at a position where a farthest sealing support supports.

In some embodiments of the present disclosure, a distal end of the first abutting portion is located at a distal end of a farthest sealing support, and a proximal end of the first abutting portion is located at a distal side or a proximal side of the farthest sealing support.

In some embodiments of the present disclosure, a proximal end of the first abutting portion is located at a proximal end of a farthest sealing support, and a distal end of the first abutting portion is located at a distal side or a proximal side of the farthest sealing support.

In some embodiments of the present disclosure, the first abutting portion is placed between the distal ends of the inner tube and the outer tube and a position 50 mm from a proximal side of the sealing support.

In some embodiments of the present disclosure, the first abutting portion is placed between a position 5 mm from a distal side of the sealing support and a position 5 mm from a proximal side of the sealing support.

In some embodiments of the present disclosure, a length of a support surface of the first abutting portion abutting the inner tube or the outer tube, along an axial direction, does not exceed 30 mm.

In some embodiments of the present disclosure, a length of a support surface of the first abutting portion abutting the inner tube or the outer tube, along an axial direction, does not exceed 15 mm.

In some embodiments of the present disclosure, a length of a support surface of the first abutting portion abutting the inner tube or the outer tube, along a circumferential direction of the inner or the outer tube, does not exceed 50% of an inner circumference of the outer tube or 50% of an outer circumference of the inner tube.

BRIEF DESCRIPTION OF THE DRAWINGS

Preferred embodiments of the present disclosure will be described in detail below by reference to the accompanying drawings, which helps understand the purpose and advantages of the present disclosure, wherein.

DETAILED DESCRIPTION

Figure 1:
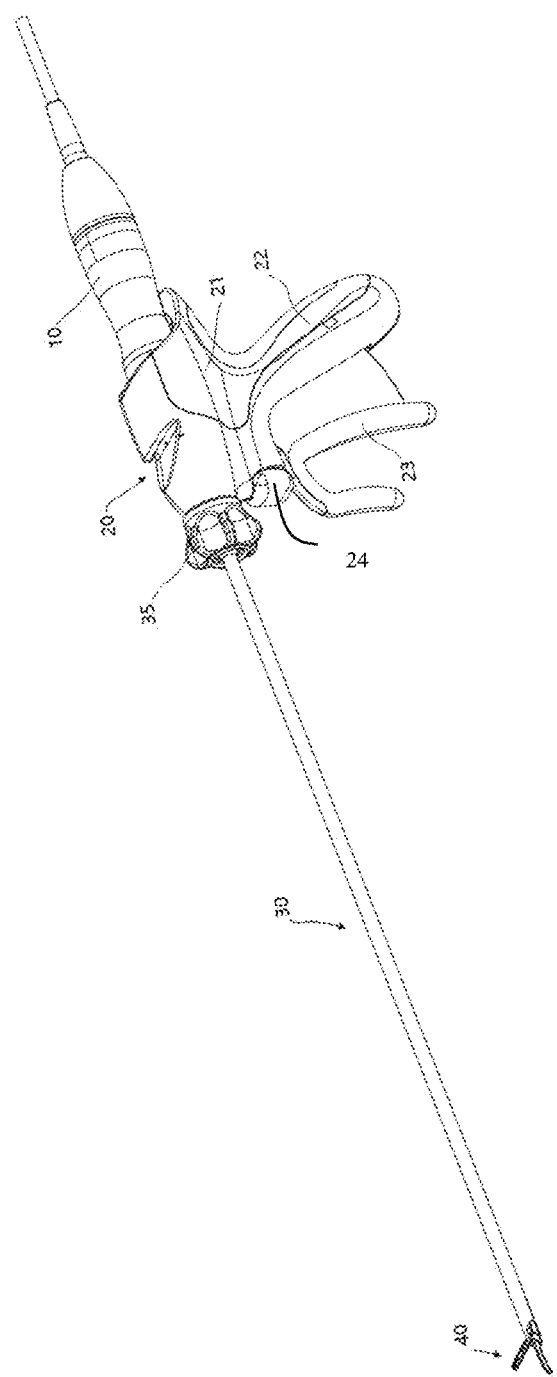
FIG. 1 is a structural schematic diagram of an embodiment of an ultrasonic surgical instrument of the present disclosure.
Figure 2:
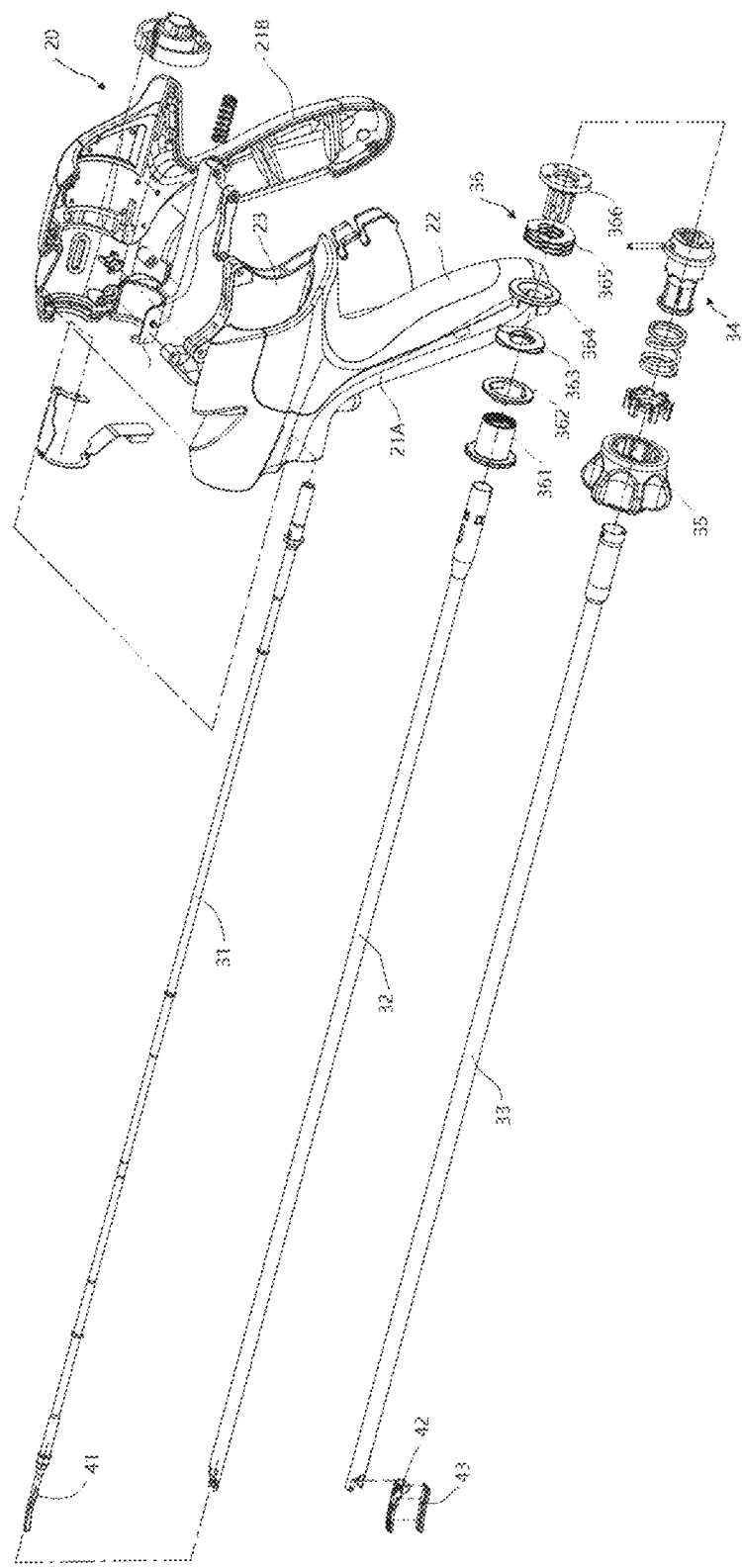
FIG. 2 is an exploded diagram of an embodiment of an ultrasonic surgical instrument of the present disclosure.
Figure 3:
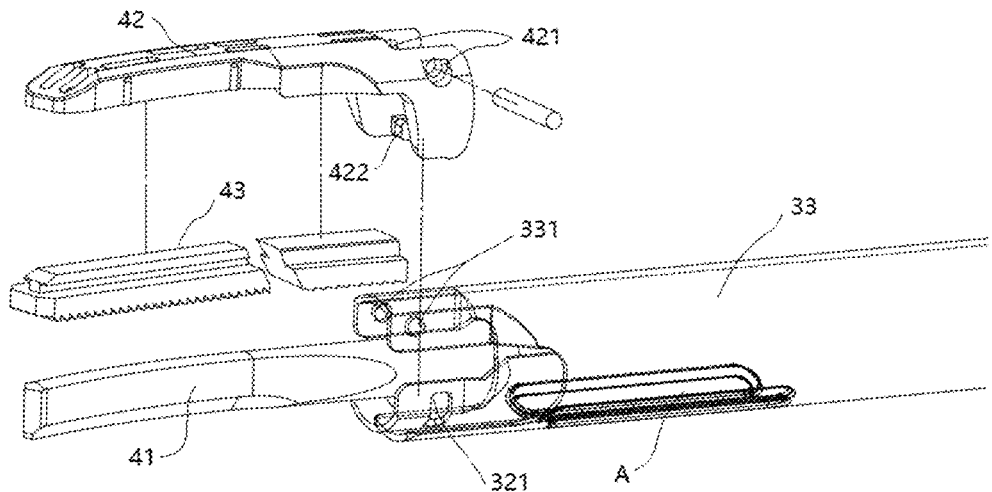
FIG. 3 is an exploded diagram of an end effector assembly in a closed state of an embodiment of an ultrasonic surgical instrument of the present disclosure.
Figure 4:
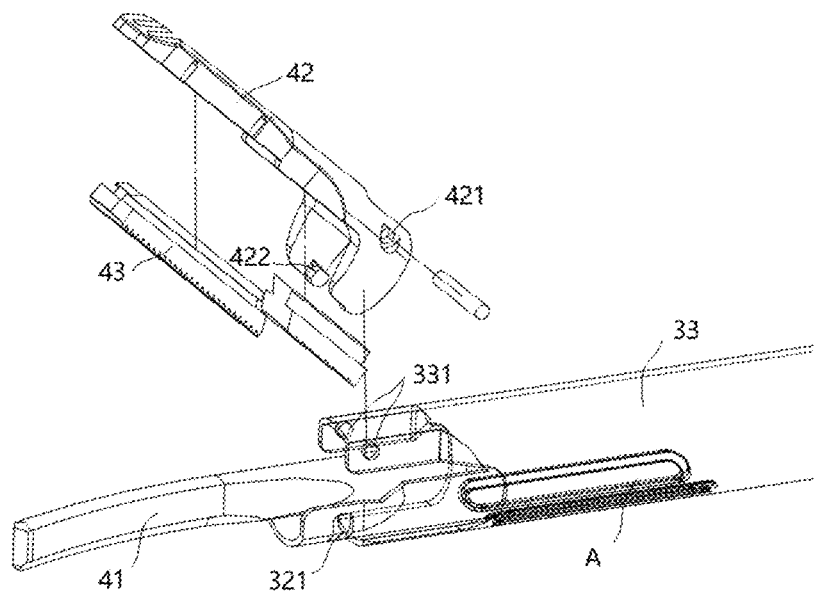
FIG. 4 is an exploded diagram of an end effector assembly in an open state of an embodiment of an ultrasonic surgical instrument of the present disclosure.
Figure 5:
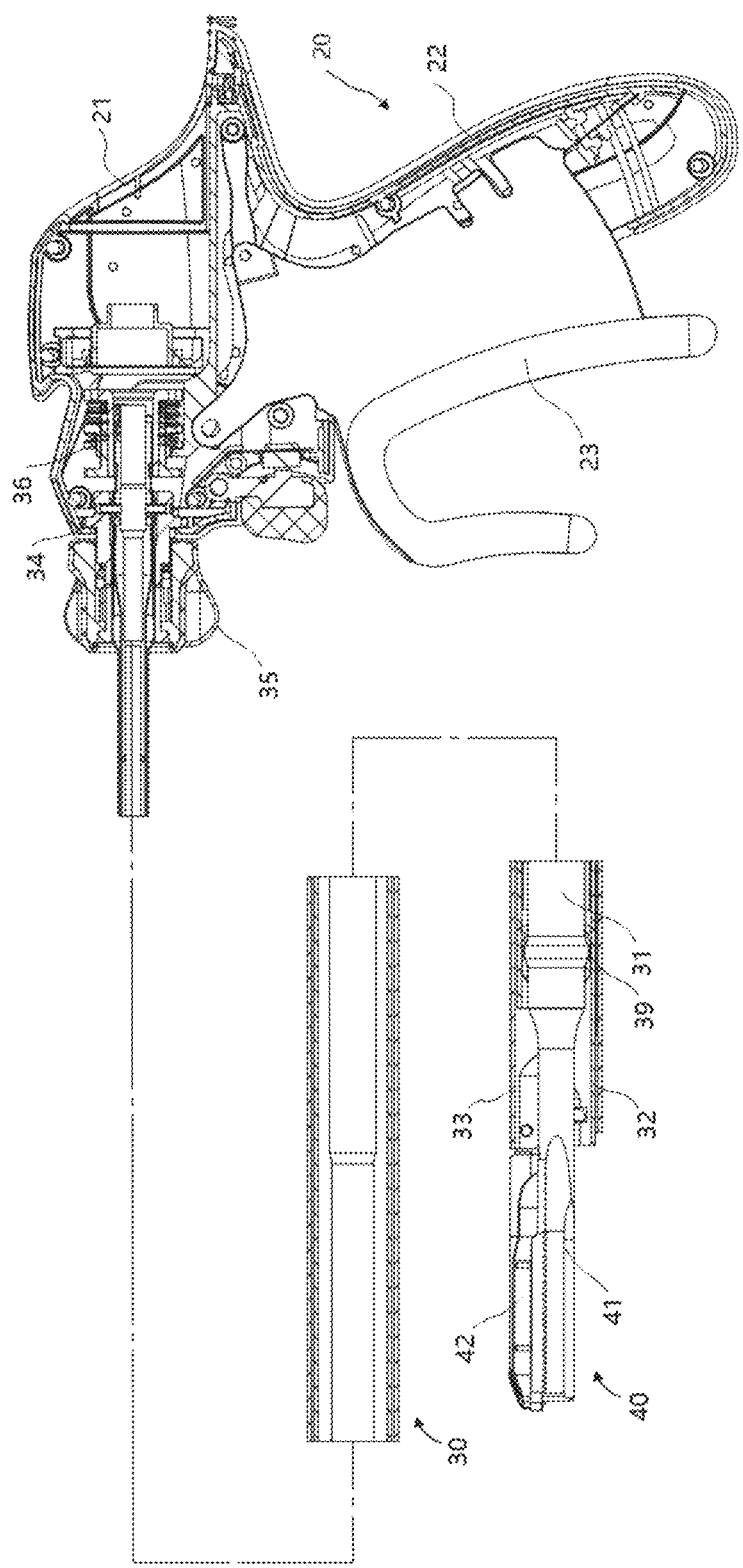
FIG. 5 is a sectional diagram of an embodiment of an ultrasonic surgical instrument of the present disclosure.

The following contents are clear and complete description of the technical solution of the present disclosure, in conjunction with the accompanying drawings. Obviously, the described embodiments are part of, not all of, the embodiments of the present disclosure. Based on the described embodiments of the present disclosure, all the other embodiments obtained by those skilled in the art, without making creative labor, belong to the protection scope of the present disclosure.

In the description of the present disclosure, the term "distal side/end" refers to the portion of the component, instrument and/or device that is away from the user (e.g., the surgeon using the instrument), while the term "proximal side/end" refers to the portion of the component, instrument and/or device that is closer to the user. In addition, the terms "first", "second" and "third" are used for descriptive purposes only and are not to be construed as indicating or implying relative importance. The terms "mounted" and "connected" are to be understood in a broad sense, for example it can be a fixed connection, a removable connection, or a one-piece connection; it can be a direct connection, or an indirect connection through an intermediate medium, and it can be a communication within two elements. For those of ordinary skills in the art, the specific meaning of the above terms in the context of the present disclosure can be understood according to specific cases.

In addition, the technical features involved in different embodiments of the present disclosure described below can be combined with each other as long as they do not constitute a conflict between them.

The application generally relates to a medical instrument and specifically to an ultrasonic surgical instrument, sometimes referred to as an ultrasonic surgical scissor, that can be used to cut tissue, coagulate tissue, and/or clamp tissue during a surgical procedure (in an open surgery or a laparoscopic surgery or an endoscopic surgery). The end effector assembly may selectively perform ultrasonic vibration, and the surgical instrument described herein can also be used to clamp and manipulate tissue without the ultrasonic vibration of the end effector assembly. When the end effector assembly performs ultrasonic vibration, the surgical instrument can be used to clamp the tissue in order to, depending on the amount of pressure applied by the clamping arm, coagulate or cut the tissue. The clamping arm (also known as the jaw member) may be selectively deployable such that the end effector assembly 40 may apply ultrasonic energy to the tissue without clamping.

FIGS. 1 to 5 are structural schematic diagrams of an embodiment of an ultrasonic surgical instrument of the present disclosure. The ultrasonic surgical instrument is used in open surgical procedures, laparoscopic procedures, or surgical procedures performing cutting actions. The ultrasonic surgical instrument comprises an ultrasonic transducer 10, a handle assembly 20, a transmission assembly 30 and an end effector assembly 40, which are arranged sequentially from a proximal end to a distal end. The ultrasonic transducer 10 is connected with an ultrasonic generator through a cable to convert the electrical power input from the ultrasonic generator to mechanical power (that is, ultrasonic waves) and transmits the mechanical power out. The transmission assembly 30 transmits the ultrasonic energy to the end effector assembly 40, and the handle assembly 20 is adapted to enable an operator to manipulate the ultrasonic surgical instrument. The handle assembly 20 can be used to control the movement of the end effector assembly 40 through the transmission assembly 30 to perform cutting/hemostatic operations. The handle assembly 20 may be shaped to be capable of being gripped by a user in a conventional manner. In an embodiment, this ultrasonic surgical instrument is manipulated to close the end effector assembly 40 by a trigger-shaped setting. By inserting the ultrasonic transducer 10 into the handle assembly 20, a proximal end of the ultrasonic surgical instrument receives a distal end of the ultrasonic transducer 10 and is assembled with the distal end.

The handle assembly 20 comprises a main housing 21 and a handle 22, and the handle 22 extends downwardly from the main housing 21. The handle assembly 20, and in particular the handle 22 of the handle assembly 20, is adapted to be held in use by a medical practitioner, which facilitates him/her grasping and manipulating the surgical instrument while isolating him/her from ultrasonic vibrations. A trigger 23 is mounted on the handle assembly 20 for pivoting toward and away from the handle 22, thereby causing a closing action of the end effector assembly 40. The handle assembly 20 is provided with a button 24 for being pressed toward the handle, thereby causing an ultrasonic energy action of the end effector assembly 40. The end effector clamps the tissue (that is, applies pressure on the tissue) under the closing action, and at the same time performs tissue cutting/hemostasis under the ultrasonic energy; the aforementioned force and the ultrasonic energy acting on the tissue can be referred to as the loading force. As an alternative embodiment of the gun-type handle 22 shown in the drawings, the handle assembly 20 may have any other different forms, such as a scissor-type handle arrangement. The proximal end of the main housing 21 is open so that the transducer can be inserted into the interior of the main housing 21.

The handle assembly 20 comprises a first half-housing 21A and a second half-housing 21B that cooperate with each other, the first half-housing 21A and the second half-housing 21B are connected together along a seam in a variety of methods known in the prior art, such as, welding, gluing, snap-fit connection and the like. It will be appreciated that the handle assembly 20 may be an integrally formed construction, or a construction in which more than two matching portions are connected together in a variety of methods. The handle assembly 20, as well as the trigger 23, may be made of a suitable sterilizable plastic material or other sterilizable material such as a plurality of metallic materials.

The end effector assembly 40 of the ultrasonic surgical instrument comprises a blade 41 and a jaw member 42 (also referred to as a clamping arm) which is capable of pivoting with respect to the blade 41. The jaw member 42 has an open position and a closed position. At the open position, at least a portion of the jaw member 42 is spaced from the blade 41; and at the closed position, the jaw member 42 is adjacent to the blade 41 and used to cut tissue located between the jaw member 42 and the blade 41.

When the instrument is used in endoscopic procedures, the transmission assembly 30 may be configured as an elongated tubular body having an outer diameter of 5.45 to 5.55 mm. The transmission assembly 30 extends distally from the handle assembly 20 of the instrument. The transmission assembly 30 comprises a waveguide 31 for transmitting ultrasonic energy from the ultrasonic transducer 10 to the blade 41, an inner tube 32 sleeved to the waveguide 31, and an outer tube 33 sleeved to the inner tube 32; wherein the outer tube 33 is fixed axially with respect to the handle assembly 20, and the jaw member 42 is pivotally connected to the outer tube 33. One end of the inner tube 32 is connected with a maneuvering mechanism of the handle assembly 20 and the other end of the inner tube acts on the jaw member 42. The maneuvering mechanism triggers the inner tube 32 to reciprocate in the axial direction relative to the outer tube 33 to drive the jaw member 42 to pivot around a pivot axis on the outer tube 33.

In some embodiments, the waveguide 31 may be made from a variety of materials, in particular a variety of medically or surgically acceptable metallic materials (such as titanium, a titanium alloy (e.g., Ti-6Al-4V), aluminum, an aluminum alloy, or stainless steel). In some embodiments, such as the embodiment shown in the drawings, the blade 41 and the waveguide 31 are integrally formed, such as by milling from a metal rod to provide the desired features. The distal end of the blade 41 is provided close to an anti-node to adjust the acoustic component to a preferred resonant frequency when not loaded with tissue. When the ultrasonic transducer 10 is supplied with energy, the distal end of the blade 41 is configured to move longitudinally, for example, in a peak-to-peak range of about 10 to 100 microns, for example, at a predetermined vibration frequency f0 of 55,500 Hz, the blade 41 preferably moves longitudinally in a range from about 20 to about 90 microns.

A jaw member pad 43 is connected to the jaw member 42, and the jaw member 42, along with the jaw member pad 43, is connected to the distal ends of the outer tube 33 and the inner tube 32. In one form of the embodiment, the jaw member pad 43 is made of a low friction coefficient polymeric material, or may be formed from any other suitable low friction material. The jaw member pad 43 is mounted on the jaw member 42 for collaboration with the blade 41, and the pivoting motion of the jaw member 42 positions the jaw member pad 43 to be substantially parallel to the blade 41 and in contact with the blade 41, thereby defining a tissue processing area. With this construction, the tissue is gripped between the jaw member pad 43 and the blade 41. As shown, the jaw member pad 43 may be provided with an uneven surface (such as, a serrated structure) to enhance clamping of the tissue in combination with the blade 41. The serrated structure or teeth may provide pulling resistant to the knife's movement. The teeth may also provide pulling opposite to the knife and clamp movement. As may be appreciated by those skilled in the art, the serrated structure is only one example of a variety of tissue engageable surfaces used to prevent movement of the tissue relative to the blade 41. Other exemplary embodiments comprise protrusions, cross-shaped patterns, tread patterns, shot-blasted or sand-blasted surfaces, and the like.

The pivoting motion of the jaw member 42 relative to the blade 41 is accomplished by providing a pair of pivoting points on the jaw member 42 that engage with the outer tube 33 and the inner tube 32 respectively. The outer tube 33 is fixedly connected with the handle assembly 20. The jaw member 42 is pivotally connected to the outer tube 33 via a first through hole 421 in the jaw member 42 and a corresponding second through hole 331 in the outer tube 33. Fastening pins or rivets slidably pass through the first through hole 421 and the second through hole 331 to pivotally connect the jaw member 42 to the outer tube 33. The inner tube 32 moves along the longitudinal axis of the outer tube 33. A pivoting pin 422 on the jaw member 42 engages a pivoting hole 321 at the distal end of the inner tube 32. Hence, the reciprocating motion of the inner tube 32 relative to the outer tube 33 causes the jaw member 42 to pivot relative to the blade 41.

The waveguide 31, outer tube 33, and inner tube 32 are connected to each other through a convex bayonet connector assembly 34, such that the waveguide 31, the outer tube 33, and the inner tube 32 can rotate as a whole together with the ultrasonic transducer 10 relative to the handle assembly 20 by means of a knob 35, the waveguide 31 extending through the knob 35 into the main housing 21 of the handle assembly 20. In operation, the knob 35 can be utilized to rotate the outer tube 33 and the waveguide 31, thereby adjusting the end effector assembly 40 and the jaw member 42 connected thereto to a desired orientation. In operation, rotation of the knob 35 relative to the handle assembly 20 causes rotation of the outer tube 33, the waveguide 31, and the ultrasonic transducer 10 operably connected thereto relative to the handle assembly 20. In the depicted embodiment, the knob 35 can be also used to maintain a portion of the bayonet connector assembly 34 within the handle assembly 20, thereby, keeping the surgical instrument in an assembled state.

The reciprocating motion of the inner tube 32 drives the jaw member 42 to open or close, and a force limiting mechanism 36 is operably connected to the inner tube 32. The force limiting mechanism 36 comprises a cannula ring cap 361, and the cannula ring cap 361 fastens a distal gasket 362, a distal waveform spring 363, a proximal gasket 364 and a proximal waveform spring 365 to a collar 366. The collar 366 comprises a lug axially extending and engaging with suitable openings in the proximal portion of the tubular inner tube 32. A circumferential groove of the inner tube 32 receives an O-ring 367 for engaging with an inner surface of the outer tube 33.

The tubular inner tube 32 comprises an elongated groove, and a connector pin 37 extends through the elongated groove to provide reciprocating movement of the inner tube 32 relative to the outer tube 33 and the waveguide 31. The pivoting motion of the jaw member 42 is affected by the reciprocating motion of the inner tube 32. The transmission assembly also comprises a driving yoke 38. The driving yoke 38 is operably connected to the trigger 23, hereby, the trigger 23 is connected to the reciprocally movable inner tube 32 through the driving yoke 38 and the force limiting mechanism 36. The trigger 23 is rotatably connected to the driving yoke 38 through a pin and a connecting member, and rotatably connected to the driving yoke 38 and the main housing 21 via a post.

Movement of the trigger 23 toward the handle moves the inner tube 32 to the proximal side, thereby pivoting the jaw member 42 toward the blade 41. The action provided by the trigger 23 and the cooperating handle 22 assists in facilitating effective manipulating and positioning of the instrument as well as manipulating the jaw member 42 at the distal end of the instrument to pivot toward the blade 41, hereby the tissue is effectively pushed against the blade 41. Movement of the trigger 23 away from the handle 22 moves the inner tube 32 to the distal side, thereby pivoting the jaw member 42 in a direction away from the blade 41.

Figure 22:
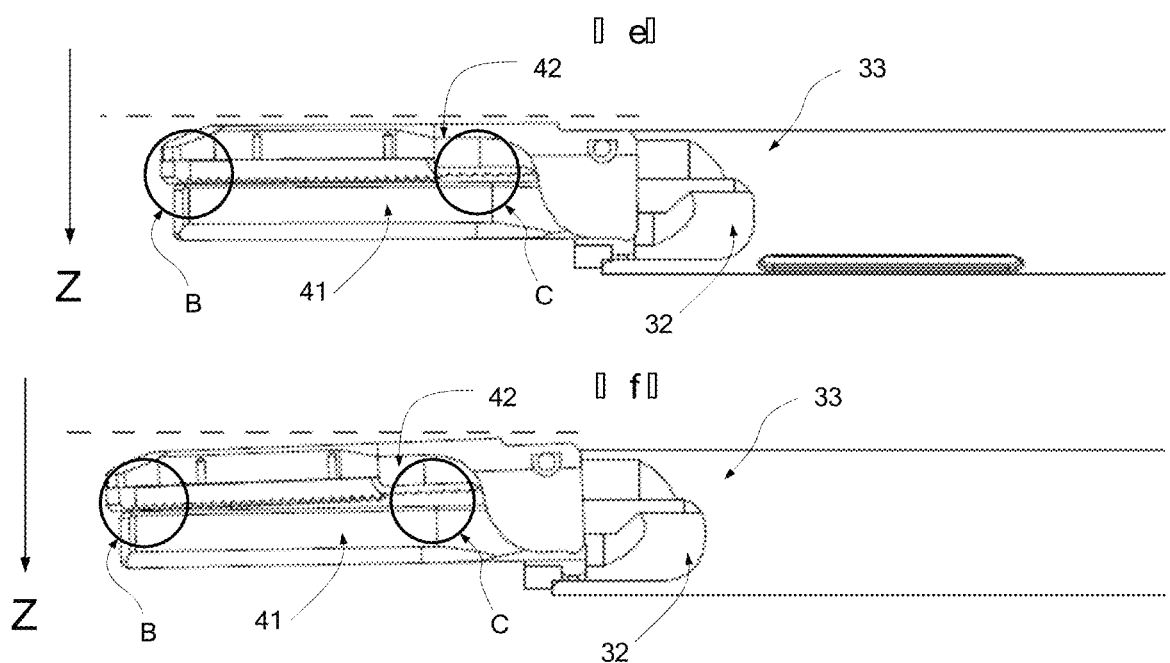
FIG. 22 is a comparison diagram between the deformation of the prior art ultrasonic surgical instrument and that of the present disclosure when the end effector assembly clamps.

When the end effector assembly 40 acts on thicker tissue, requiring larger force to manipulate the trigger 23 to clamp the tissue, the force of the jaw member 42 in the Z-direction is greater, which in turn tends to move the blade 41 in the Z-direction, and the assembly clearance between the inner tube and outer tube allows the blade 41 to move in the Z-direction. Specifically, the waveguide 31 that is fastened to or integrated with the blade 41 contacts the inner tube 32 through a sealing support 39 without any clearance, while there is an assembly clearance between the inner tube and outer tube. As shown in FIG. 22(f), the upper part of the straight line connecting the previously mentioned pivoting points is inclined to the left (in other words, the lower part of the straight line is inclined to the right); at this time, the distal end B of the end effector assembly 40 is closed, while a large gap still exists at the proximal end C. If a tissue is clamped, there will be less pressure at the proximal end C, and then it will be prone to the situation where the tissue portion clamped at the distal end has been completed cut/has stopped bleeding under pressure and energy, while the tissue clamped at the proximal end has not been completed cut/has not stopped bleeding. That is, the end effector assembly 40 are poor in loading force consistency when acting on tissues, and it is easy to cause part of the tissue are not cut off or coagulated.

Since the ultrasonic energy on the blade 41 gradually increases from proximal to distal, in order to make the loading on the blade 41 consistent from proximal to distal when the end effector assembly 40 performs tissue cutting/hemostasis, it is necessary to make the force on the blade 41 gradually decrease from proximal to distal. For this purpose, the inner tube 32 and the outer tube 33 are provided with a first abutting portion at their distal sides. The first abutting portion forms a support between the inner tube and the outer tube, so as to bring the clearance between the distal ends of the inner tube and outer tube close to zero, which may avoid a radial clearance change between the inner tube and the outer tubes without affecting the relative sliding movement of the inner tube and the outer tubes, that is, when the blade receives the force along the Z direction from the jaw member, the offset distance of the inner tube 32 along the Z direction is close to zero, thus avoiding change in the radial clearance between the inner tube and outer tube. More specifically, the inner side of the first abutting portion abuts or is formed integrally with the outer wall of the inner tube 32, and an outer side of the first abutting portion is formed integrally with or abuts against an inner wall of the outer tube 33. In this way, by providing the first abutting portion on the distal end, the clearance between the inner tube 32 and the outer tube 33 is further reduced. As shown in FIG. 22(e), when the jaw member 42 is pivoted to the blade 41 to perform tissue cutting/hemostasis, the position offset of the blade 41 along the radial Z-direction is reduced almost to zero, under the support at the distal ends of the inner tube 32 and the outer tube 33. At this time, the distal end B of the end effector assembly 40 is closed, and the gap at the proximal end C is relatively small, so that the force on the blade 41 gradually increases from the distal end to the proximal end.

Figure 6:
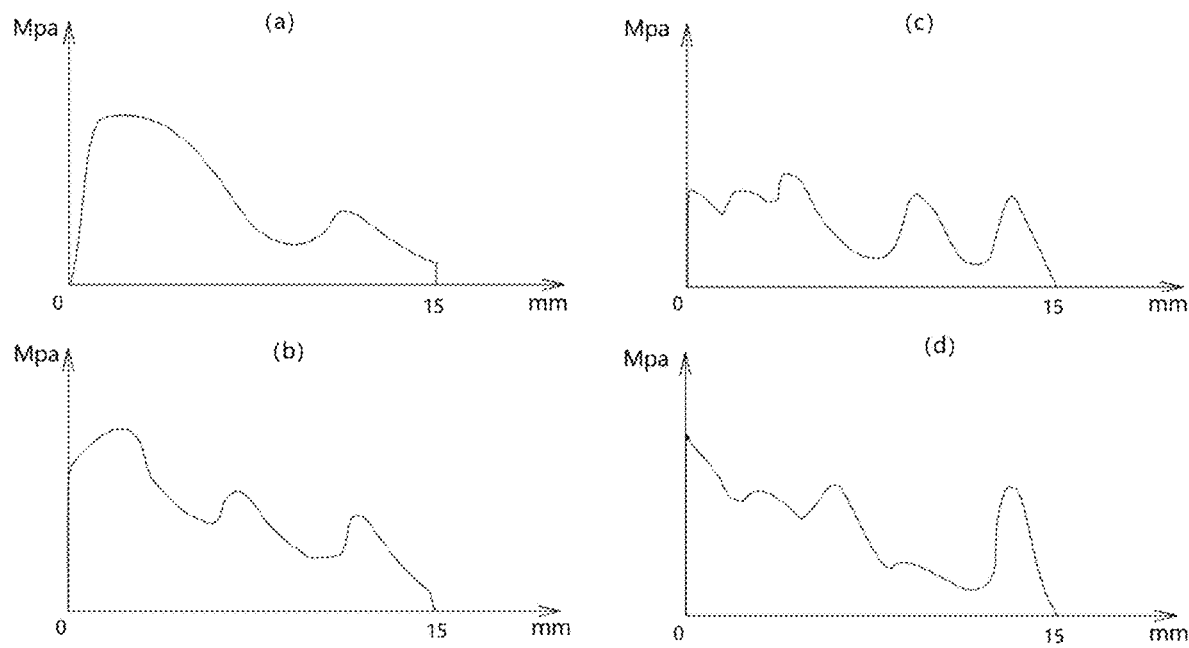
FIG. 6 is a comparison diagram of the force on a blade of prior art ultrasonic instruments with different waveguide diameters.
Figure 21:
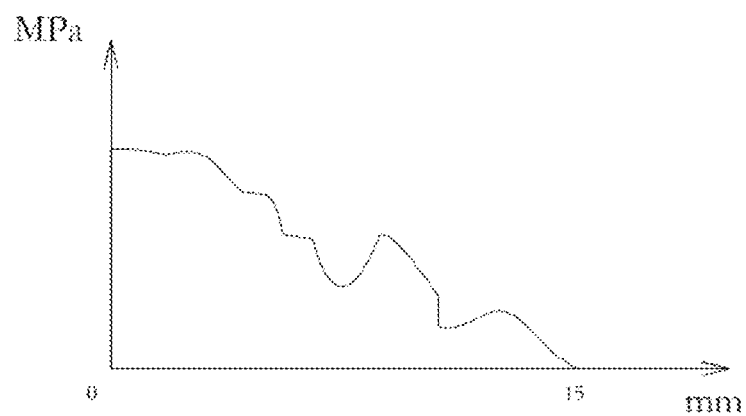
FIG. 21 is a diagram of the force on a blade of the ultrasonic surgical instrument of the present disclosure.

FIG. 6(a) illustrates the force on the blade of a first prior art general ultrasonic surgical instrument with a waveguide diameter of D1, when the blade cuts a tissue. FIG. 6(b) illustrates the force on the blade of a second prior art general ultrasonic surgical instrument with a waveguide diameter of D1, when the blade cuts a tissue. FIG. 6(c) illustrates the force on the blade of the first prior art general ultrasonic surgical instrument with a waveguide diameter of D2, when the blade cuts a tissue. FIG. 6(d) illustrates the force on the blade of the second prior art general ultrasonic surgical instrument with a waveguide diameter of D2, when the blade cuts a tissue. D2<D1. The first prior art general ultrasonic surgical instrument and the second prior art general ultrasonic surgical instrument have different specific structures or they are made by different manufacturers, but neither of them utilizes the above-described embodiment of the present disclosure. According to the comparison of the four diagrams of FIG. 6, it can be seen that from the proximal end of the blade (i.e., the position of the origin of the coordinates in the diagrams) to the distal end (at the horizontal coordinate position of 15 mm in the diagrams), with a rod having a larger diameter, the force on the blades in the first and second prior art general ultrasonic surgical instruments basically shows a gradually decreasing trend. With a rod having a smaller diameter, the force on the blades fluctuates greatly and does not show a gradual decreasing trend from the proximal end to the distal end. FIG. 21 illustrates the force on the blade of the ultrasonic surgical instrument according to the above embodiment of the present disclosure, when the blade cuts tissue. The force on the blade shows a gradually decreasing trend from the proximal end to the distal end.

For this reason, the ultrasonic surgical instrument adopting the specific embodiment described above has a better consistency of cutting/hemostasis from proximal end to distal end when the rod diameter of the waveguide is small.

At least one sealing support 39 is provided between the inner tube 32 and the waveguide 31. In a specific embodiment, a plurality of grooves or notches for installing the sealing support 39 are formed in the outer perimeter of the waveguide 31, and the grooves are located at the nodes of the waveguide 31. Since the ultrasonic amplitude at the nodes of the waveguide 31 is zero, setting the sealing support 39 here can achieve the effective support of the waveguide 31 while not affecting the ultrasonic transmission of the waveguide 31. The sealing support 39 is specifically a sealing rubber ring provided in the grooves, and the sealing rubber ring is made of a flexible material such as silicone. The sealing support 39 provided at the farthest node is closest to the end effector assembly 40, and it also prevents the tissue residual liquid generated by the cutting of the end effector assembly 40 from entering the interior of the transmission assembly 30 through the region between the waveguide 31 and the inner tube 32.

In a specific embodiment, the first abutting portion extends proximally to the position of the sealing support 39 which is located at the distal side. In this way, the waveguide 31 receives an effective support at the distal sides of the inner tube and the outer tube 33. More specifically, taking the farthest sealing support 39 as a reference point, the first abutting portion is placed between the distal end of the inner or outer tube 33 and a position 50 mm from the proximal side of the sealing support 39, preferably, it is placed between a position 5 mm from the distal side of the sealing support 39 and a position 5 mm from the proximal side thereof to achieve more stable support for the waveguide 31. A length of an abutting support surface between the first abutting portion and the inner tube 32 or the outer tube 33, along a circumferential direction of the inner tube and the outer tube, does not exceed 50% of an inner circumference of the outer tube or 50% of an outer circumference of the inner tube.

More specifically, in an embodiment, the first abutting portion is located at a support position corresponding to the farthest sealing support 39. That is, the axial position and length of the first abutting portion correspond to the axial position and length of the sealing support 39, respectively.

In another embodiment, a distal end of the first abutting portion is located at a distal end of the farthest sealing support 39, and a proximal end of the first abutting portion is located at a distal or proximal side of the farthest sealing support 39. This embodiment comprises two situations; in one situation, the whole first abutting portion is located at the distal end of the farthest sealing support 39; and in the other situation, the first abutting portion is partially located at the distal end of the farthest sealing support 39 and partially located at the proximal end of the farthest sealing support 39.

In a further embodiment, a proximal end of the first abutting portion is located at a proximal end of the farthest sealing support 39, and a distal end of the first abutting portion is located at a distal or proximal side of the farthest sealing support 39. This embodiment comprises two situations; in one situation, the whole first abutting portion is located at the proximal end of the farthest sealing support 39; and in the other situation, the first abutting portion is partially located at the proximal end of the farthest sealing support 39 and partially located at the proximal end of the farthest sealing support 39. The three main structural formations of the first abutting portion is described below.

<First Structural Formation>

Figure 7:
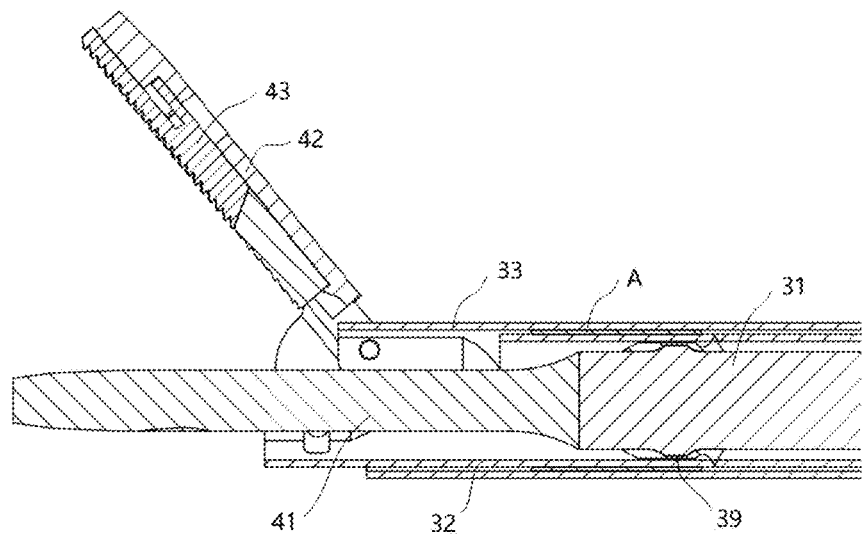
FIG. 7 is a structural schematic diagram of a first structural form of a first abutting portion of the present disclosure.

As shown in FIG. 7, the first abutting portion is at least one sheet A provided between the inner tube 32 and the outer tube 33. By providing the sheet A that is independent of the inner tube 32 and the outer tube 33, the processing difficulty of the inner and outer tubes 33 can be reduced. More specifically, the surface of the sheet A is formed as a curved surface matching the wall of the inner and the outer tube 33, which allows the sheet A to have a larger contact area with the outer wall of the inner tube 32 and the inner wall of the outer tube 33 to achieve stable support of the waveguide 31. More specifically, the sheets A are evenly distributed along the circumference. The length of the sheet A provided along the circumferential direction of the inner and outer tubes does not exceed 50% of the inner circumference of the outer tube 33 or 50% of the outer circumference of the inner tube 32.

In order to make the installation of the independent sheet A more stable, in an specific embodiment, the outer wall of the inner tube 32 and/or the inner wall of the outer tube 33 is provided with a recess and the sheet A is located in the groove to limit the position of the sheet A.

In an embodiments, the sheet A is a long strip shape and extends along the axial direction of the inner tube 32 and the outer tube 33, and the sheet A extends to a position where the farthest sealing support 39 is located.

In another embodiment, the sheet A is annular shape and surrounds an annular gap between the inner tube 32 and the outer tube 33. There may be several annular sheets A, which are arranged at intervals along the axial direction of the inner tube 32 and the outer tube 33 until a position close to the farthest sealing support 39.

The length of the sheet A along the axial direction does not exceed 30 mm, and the distal end of the sheet A is located at the distal end of the farthest sealing support 39, and the proximal end of the sheet A is located at the proximal side of the farthest sealing support 39.

<Second Structural Formation>

Figure 8:
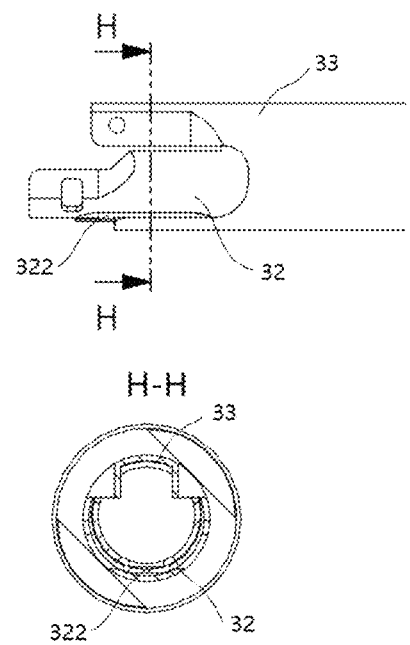
FIG. 8 is a structural schematic diagram of an embodiment of a second structural form of the first abutting portion of the present disclosure.
Figure 9:
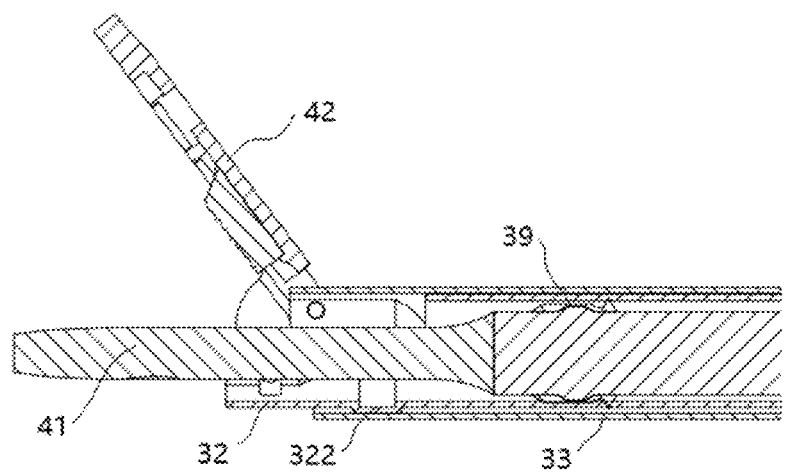
FIG. 9 is a structural schematic diagram of an embodiment of the second structural form of the first abutting portion of the present disclosure.

As shown in FIGS. 8 and 9, the first abutting portion is a first projection 322 formed integrally into the outer wall of the inner tube 32 and protruding outwardly, with the protruding surface of the first projection 322 abutting the inner wall of the outer tube 33. The first abutting portion having this structural formation can be integrally formed with the inner tube 32, thereby reducing the manufacturing cost.

More specifically, in an embodiment, as shown in FIG. 8, the first projection 322 is formed as a long strip shape extending in the axial direction of the inner tube 32. More specifically, the first projections 322 are evenly arranged along the circumferential direction of the inner tube 32, and the first projections 322 are placed between the distal end of the inner or outer tube and a position 20 mm from the proximal side of the sealing support 39, preferably, it is placed between a position 5 mm from the distal side of the sealing support 39 and a position 5 mm from the proximal side thereof to achieve more stable support for the waveguide 31. A length of the support surface of the first projections 322 abutting the inner tube 32 or the outer tube 33, along a circumferential direction of the inner tube and the outer tube, does not exceed 50% of an inner circumference of the outer tube or 50% of an outer circumference of the inner tube.

More specifically, in another embodiment, as shown in FIG. 9, the first projection 322 is formed as an annular shape, and may also be formed as a spiral ring shape or a circular arcuate shape. Several first projections 322 of annular or arc shape may be provided in parallel, the first projections 322 are arranged at intervals along the axial direction of the inner tube 32 up to a position where the farthest sealing support 39 is located.

More specifically, in a further embodiment, the first projections 322 are formed as arc-shaped protruding points distributed in a matrix along the axial and circumferential directions of the inner tube 32, for example, an arc-shaped protruding point is provided every 3 to 5 mm along the axial direction of the inner tube 32, and every 20 to 30 degrees along the circumferential direction of the inner tube 32.

<Third Structural Formation>

As shown in FIGS. 10 to 20, the first abutting portion is a second projection 332 formed integrally with the inner wall of the outer tube 33 and protruding inwardly, and the protruding surface of the second projection 332 abuts the outer wall of the inner tube 32. The second projection 332 in this structural formation is integrally formed with the outer tube 33, thereby reducing the manufacturing cost.

Figure 10:
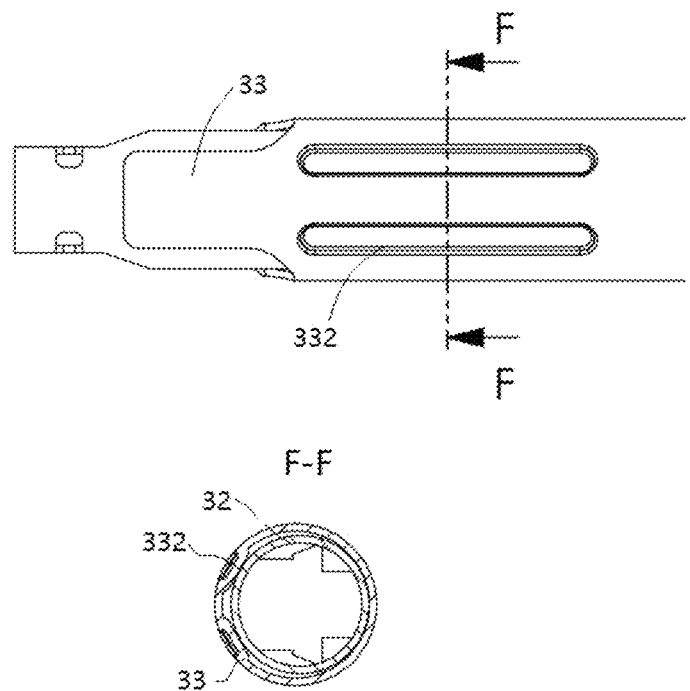
FIG. 10 is a structural schematic diagram of an embodiment of a third structural form of the first abutting portion of the present disclosure.
Figure 11:
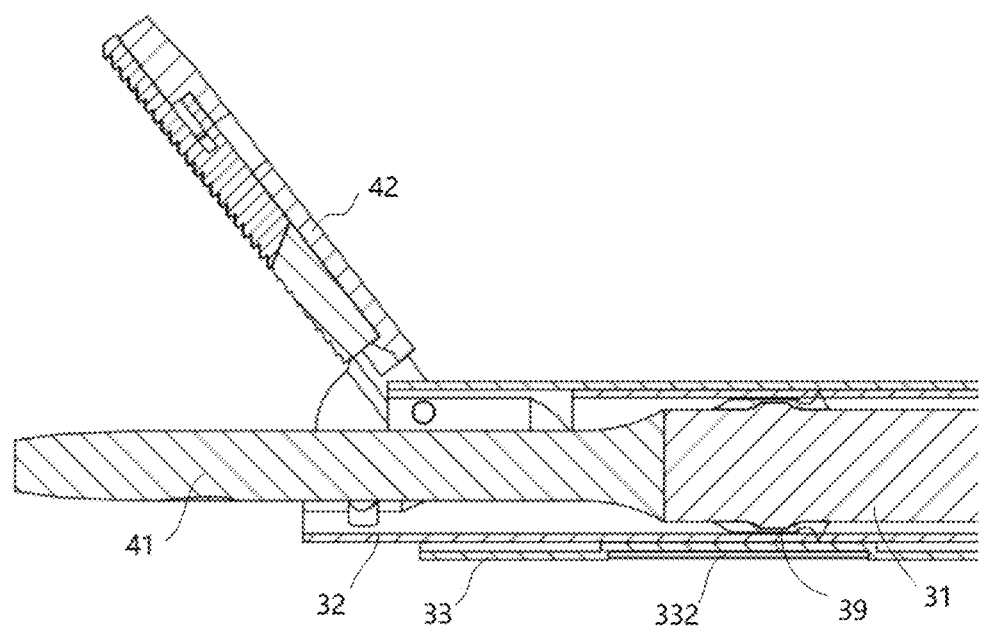
FIG. 11 is a structural schematic diagram of an embodiment of the third structural form of the first abutting portion of the present disclosure.

In a more specific embodiment, as shown in FIGS. 10 and 11, the second protrusion 332 is formed as a long strip shape extending along the axial direction of the outer tube 33. The second protrusions 332 are evenly arranged along the circumferential direction of the outer tube 33. The distal end of the second protrusion 332 is located at the distal end of the farthest sealing support 39. The proximal end of the sheet A is located at the proximal side of the farthest sealing support 39. Preferably, it is placed between a position 5 mm from the distal side of the sealing support 39 and a position 5 mm from the proximal side thereof to achieve more stable support for the waveguide 31. A length of the support surface of the second projection 332 abutting the inner tube or the outer tube, along a circumferential direction of the inner tube and the outer tube, does not exceed 50% of an inner circumference of the outer tube 33 or 50% of an outer circumference of the inner tube.

Figure 12:
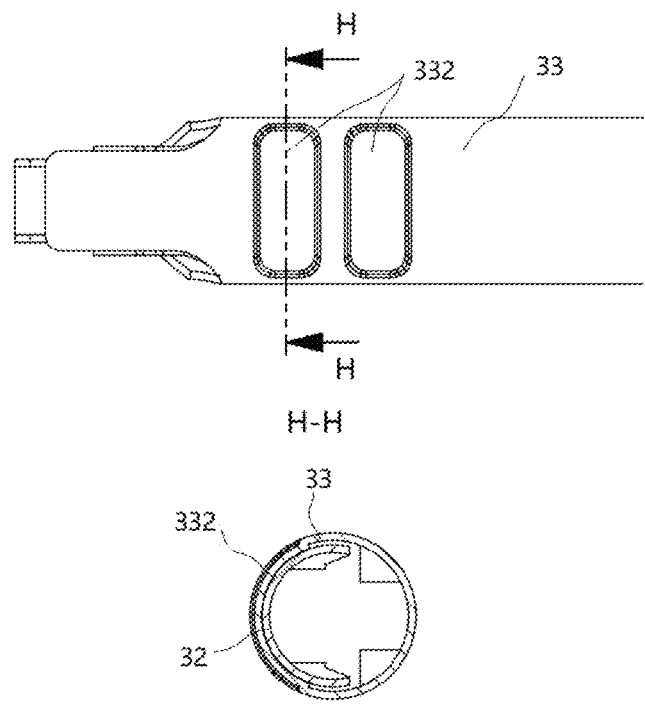
FIG. 12 is a structural schematic diagram of an embodiment of the third structural form of the first abutting portion of the present disclosure.
Figure 13:
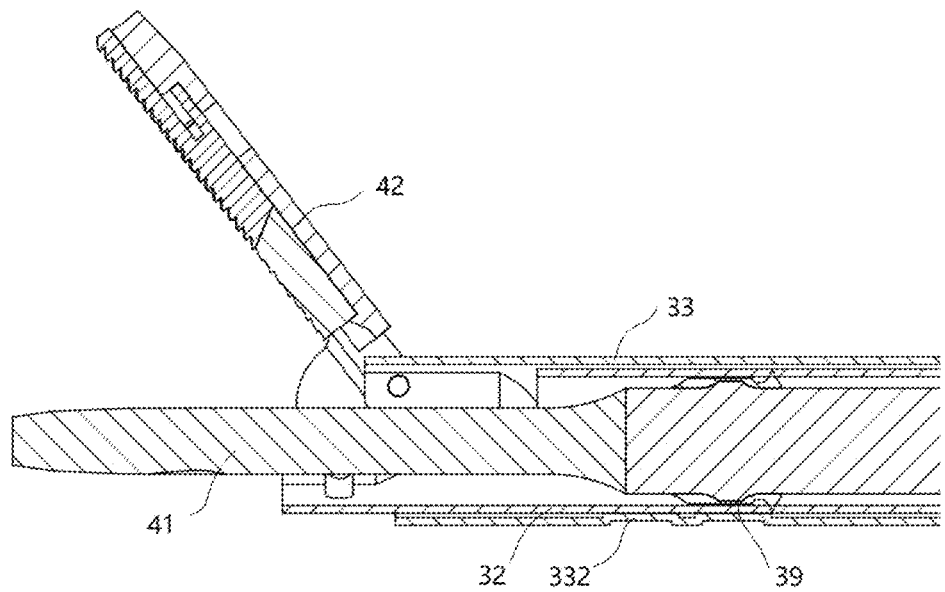
FIG. 13 is a structural schematic diagram of an embodiment of the third structural form of the first abutting portion of the present disclosure.
Figure 14:
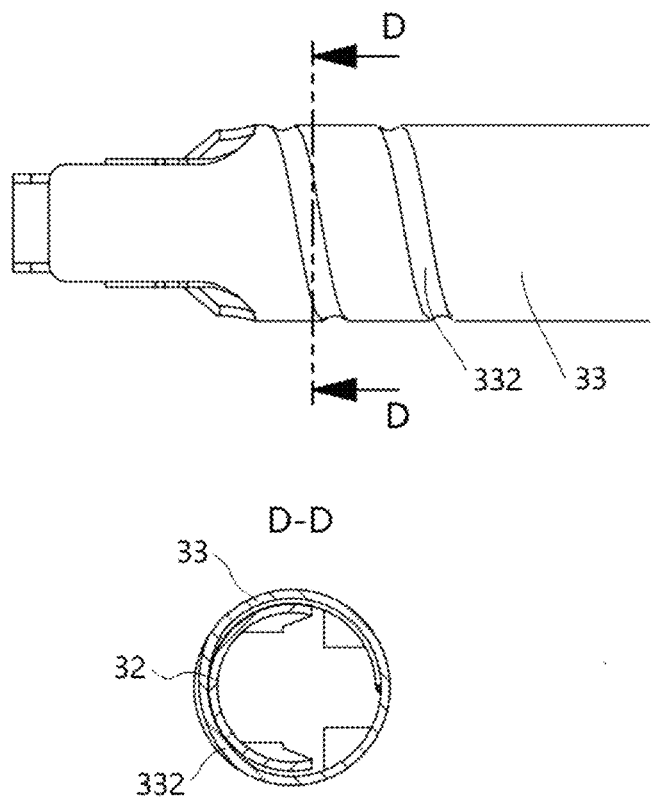
FIG. 14 is a structural schematic diagram of an embodiment of the third structural form of the first abutting portion of the present disclosure.
Figure 15:
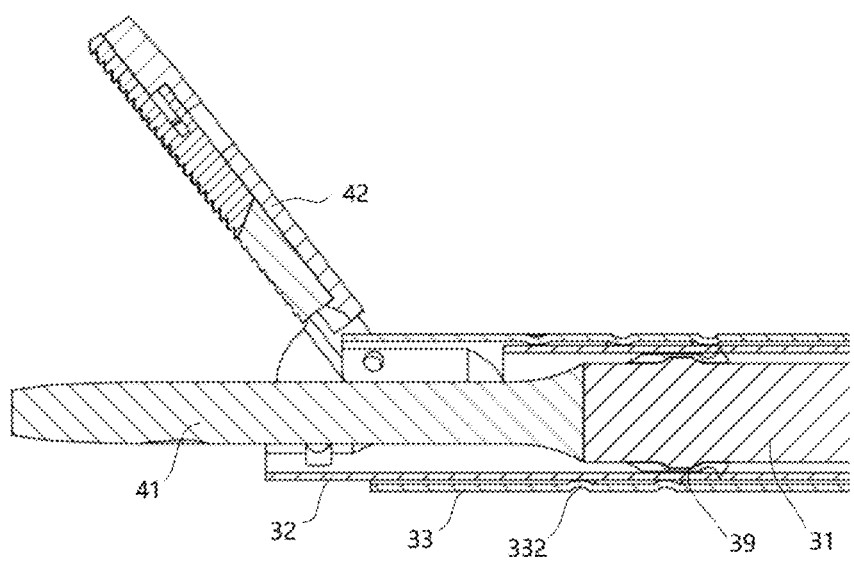
FIG. 15 is a structural schematic diagram of an embodiment of the third structural form of the first abutting portion of the present disclosure.
Figure 16:
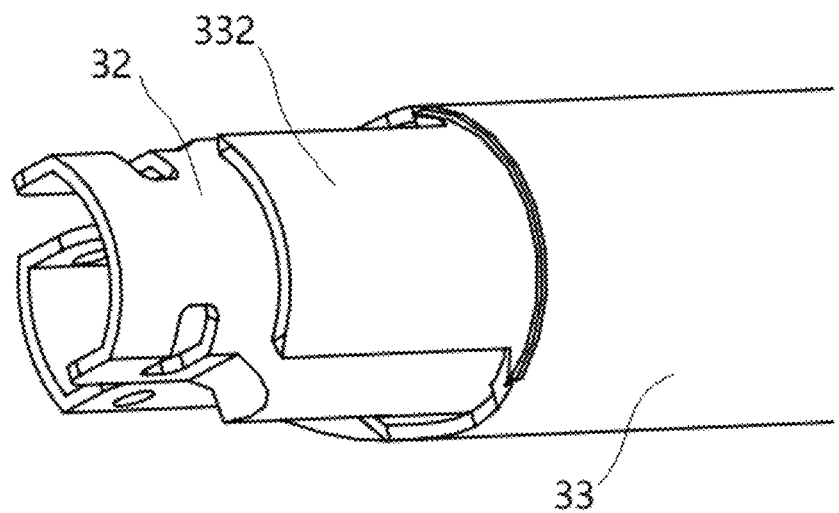
FIG. 16 is a structural schematic diagram of an embodiment of the third structural form of the first abutting portion of the present disclosure.
Figure 17:
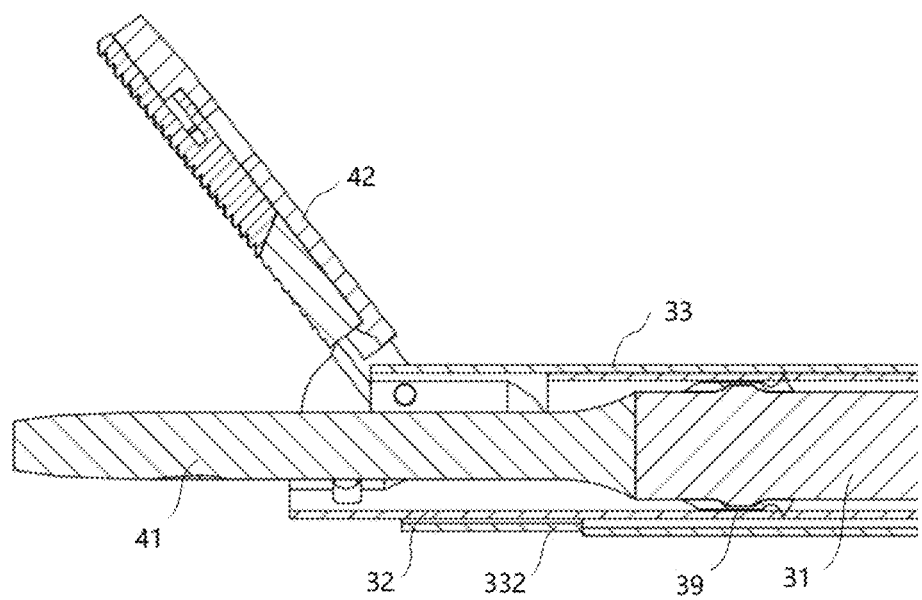
FIG. 17 is a structural schematic diagram of an embodiment of the third structural form of the first abutting portion of the present disclosure.
Figure 18:
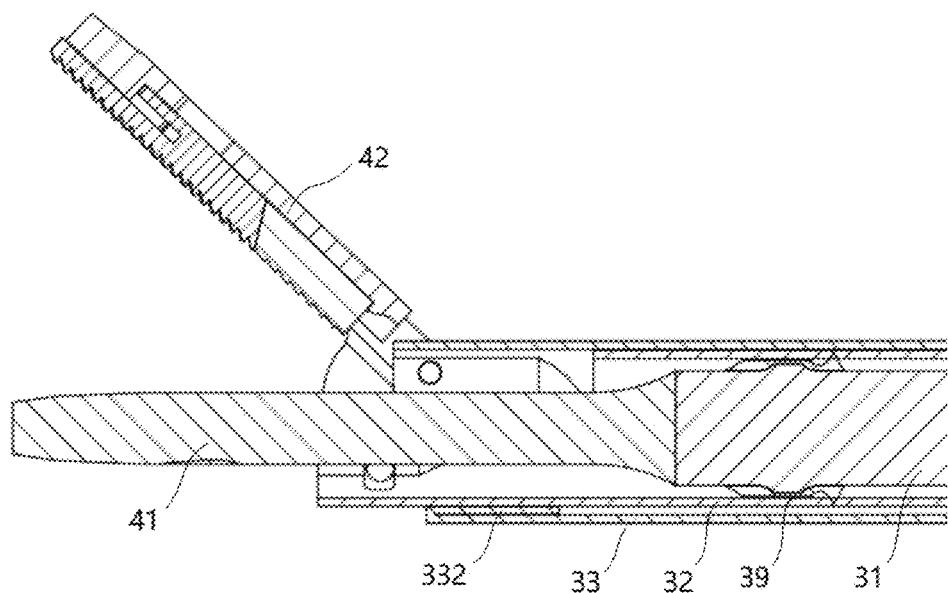
FIG. 18 is a structural schematic diagram of an embodiment of the third structural form of the first abutting portion of the present disclosure.

In another embodiment, the second projection 332 is formed as an annular shape, spiral ring shape or arc shape surrounding a inner wall of the outer tube. As shown in FIGS. 12 and 13, a number of the second projections 332 of circular or arc shape may be provided in parallel, arranged at intervals along the axial direction of the outer tube 33 up to a position where the farthest sealing support 39 is located. As shown in FIGS. 14 and 15, the spiral ring shaped second projection 332 is located close to the location of the sealing support 39. As shown in FIGS. 16, 17 and 18, the annular shaped second projection 332 is located at a distal end of the outer tube 33, wherein the second projections 332 of FIGS. 16 and 17 is formed by necking the outer tube 33, and the second projections 332 of FIG. 18 is formed by bending inwardly the end of the outer tube 33. The way of integrally forming the outer tube 33 and the second projection 332 is not limited to the above two methods, and other mechanical processing methods for forming of the second projection 332 having the above structural features fall within the scope of protection of the application.

Figure 19:
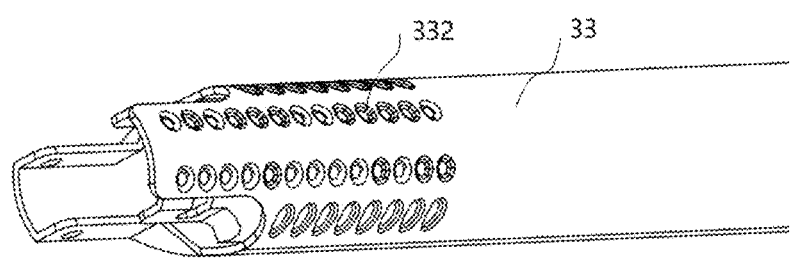
FIG. 19 is a structural schematic diagram of an embodiment of the third structural form of the first abutting portion of the present disclosure.
Figure 20:
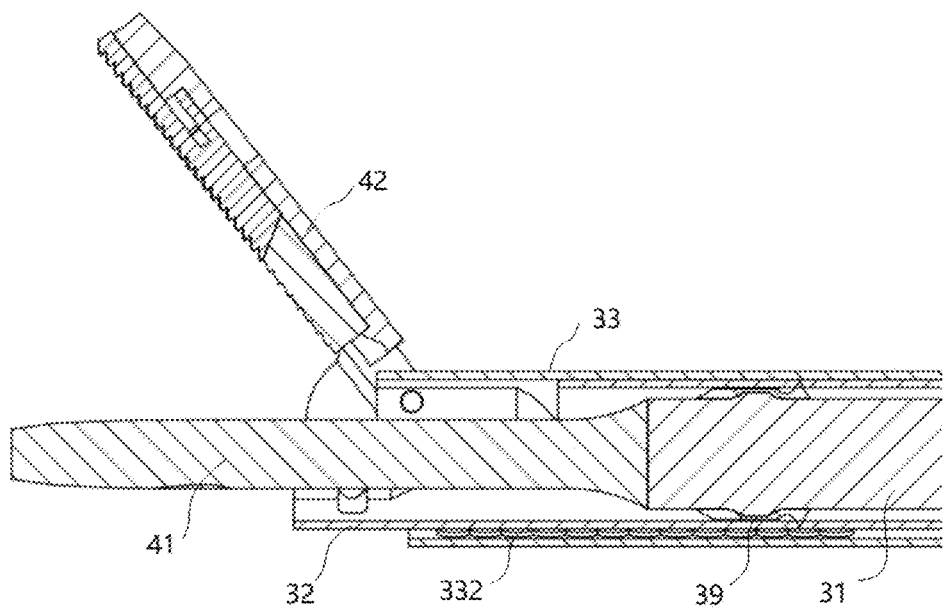
FIG. 20 is a structural schematic diagram of an embodiment of the third structural form of the first abutting portion of the present disclosure.

In another embodiment, as shown in FIGS. 19 and 20, the second projections 332 are formed as arc-shaped protruding points distributed in a matrix along the axial direction and the circumferential direction of the outer tube 33, for example, an arc-shaped protruding point is provided every 3 to 5 mm along the axial direction of the outer tube 33, and every 20 to 30 degrees along the circumferential direction of the outer tube 33.

Obviously, the above embodiments are merely examples for clarity and are not limitations on the implementation. For those skilled in the art, there are other variations or changes that can be made in different forms based on the above description. It is unnecessary and it is impossible to list all implementations here. The obvious variations or changes derived therefrom are still within the scope of protection of the present disclosure.

What is claimed is:

1. An ultrasonic surgical instrument, comprising:
a waveguide for transmitting ultrasonic energy, wherein a blade is arranged on the distal end thereof;
a jaw member pivotably arranged with respect to the blade, wherein the jaw member has an open position and a closed position, wherein in the open position, the jaw member is spaced from the blade to receive a tissue; and in the closed position, the jaw member is adjacent to the blade so as to cut the tissue located therebetween; and
an inner tube and an outer tube, wherein the inner tube is sleeved on the waveguide, and the outer tube is sleeved on the inner tube, wherein the jaw member is pivotably engaged with a distal end of the outer tube, and a distal end of the inner tube is engaged with the jaw member so that sliding of the inner tube with respect to the outer tube actuates the jaw member to pivot with respect to the blade;

wherein the ultrasonic surgical instrument further comprises a first abutting portion provided between the distal portions of the inner tube and the outer tube, configured to provide a support and maintain a radial clearance therebetween without affecting relative sliding movement of the inner tube and the outer tubes.

2. The ultrasonic surgical instrument according to claim 1, wherein an inner side of the first abutting portion abuts or is formed integrally with an outer wall of the inner tube, and an outer side of the first abutting portion abuts or is formed integrally with an inner wall of the outer tube.

3. The ultrasonic surgical instrument according to claim 1, wherein the first abutting portion is at least one sheet provided between the inner tube and the outer tube.

4. The ultrasonic surgical instrument according to claim 3, wherein an outer wall of the inner tube and/or an inner wall of the outer tube is provided with a recess, and the sheet is located within the recess.

5. The ultrasonic surgical instrument according to claim 3 or 4, wherein the sheet is a long strip shape and extends along an axial direction of the inner tube and the outer tube.

6. The ultrasonic surgical instrument according to claim 3 or 4, wherein the sheet is an annular shape and surrounds an annular gap between the inner tube and the outer tube.

7. The ultrasonic surgical instrument according to claim 1, wherein the first abutting portion is at least one first projection which is formed integrally with a wall of the inner tube and protruded outwardly.

8. The ultrasonic surgical instrument according to claim 7, wherein the at least one first projection is formed as a long strip shape extending in an axial direction of the inner tube.

9. The ultrasonic surgical instrument according to claim 8, further comprising a plurality of first projections, wherein the first projections are evenly arranged along a circumference direction of the inner tube.

10. The ultrasonic surgical instrument according to claim 7, wherein the first projection is formed as an annular shape, spiral ring shape, or arc shape provided along a circumference direction of the inner tube.

11. The ultrasonic surgical instrument according to claim 7, further comprising a plurality of first projections, wherein the first projections are formed as arc-shaped protruding points distributed in a matrix along the axial direction and the circumferential direction of the inner tube.

12. The ultrasonic surgical instrument according to claim 1, wherein the first abutting portion is at least one second projection which is formed integrally with a wall of the outer tube and protruded inwardly.

13. The ultrasonic surgical instrument according to claim 1, wherein at least one sealing support is provided between the inner tube and the waveguide, and the sealing support is located at a node of the waveguide.

14. The ultrasonic surgical instrument according to claim 13, wherein the first abutting portion is located at a position where a farthest sealing support supports.

15. The ultrasonic surgical instrument according to claim 13, wherein a distal end of the first abutting portion is located at a distal end of a farthest sealing support, and a proximal end of the first abutting portion is located at a distal side or a proximal side of the farthest sealing support.

16. The ultrasonic surgical instrument according to claim 13, wherein a proximal end of the first abutting portion is located at a proximal end of a farthest sealing support, and a distal end of the first abutting portion is located at a distal side or a proximal side of the farthest sealing support.

17. The ultrasonic surgical instrument according to claim 13, wherein the first abutting portion is placed between the distal ends of the inner tube and the outer tube and a position 50 mm from a proximal side of the sealing support.

18. The ultrasonic surgical instrument according to claim 1, wherein a length of a support surface of the first abutting portion abutting the inner tube or the outer tube, along an axial direction, does not exceed 30 mm.

19. The ultrasonic surgical instrument according to claim 1, wherein a length of a support surface of the first abutting portion abutting the inner tube or the outer tube, along an axial direction, does not exceed 15 mm.

20. The ultrasonic surgical instrument according to claim 1, wherein a length of a support surface of the first abutting portion abutting the inner tube or the outer tube, along a circumferential direction of the inner or the outer tube, does not exceed 50% of an inner circumference of the outer tube or 50% of an outer circumference of the inner tube.

* * * * *